Feb. 18, 1958 R. DELZER 2,823,947
BALE LOADER
Filed Dec. 28, 1953 4 Sheets-Sheet 3
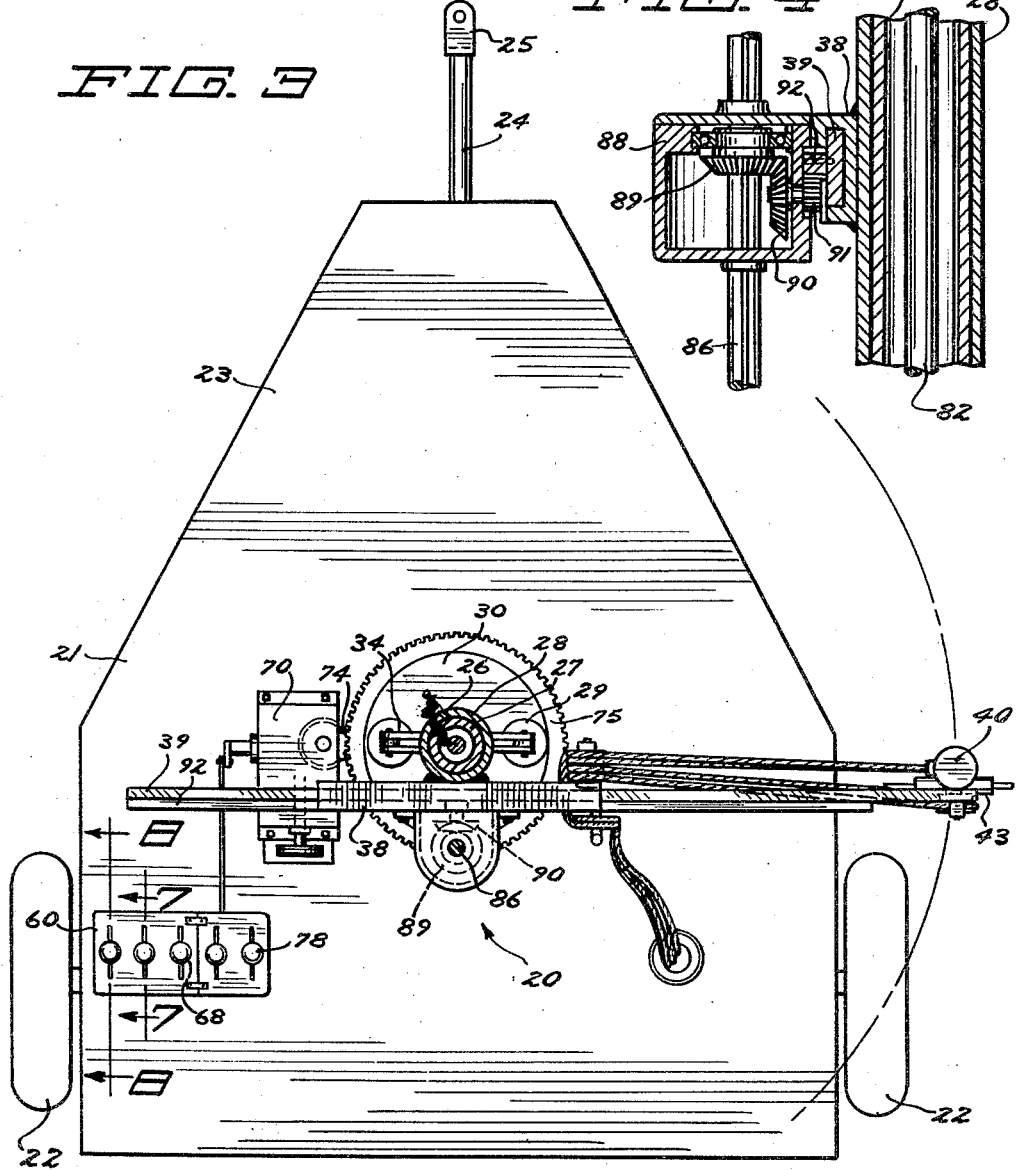
INVENTOR.
REINHOLD DELZER
BY
Braddock and Braddock
ATTORNEYS Feb. 18, 1958  R. DELZER  2,823,947
BALE LOADER
Filed Dec. 28, 1953  4 Sheets-Sheet 4

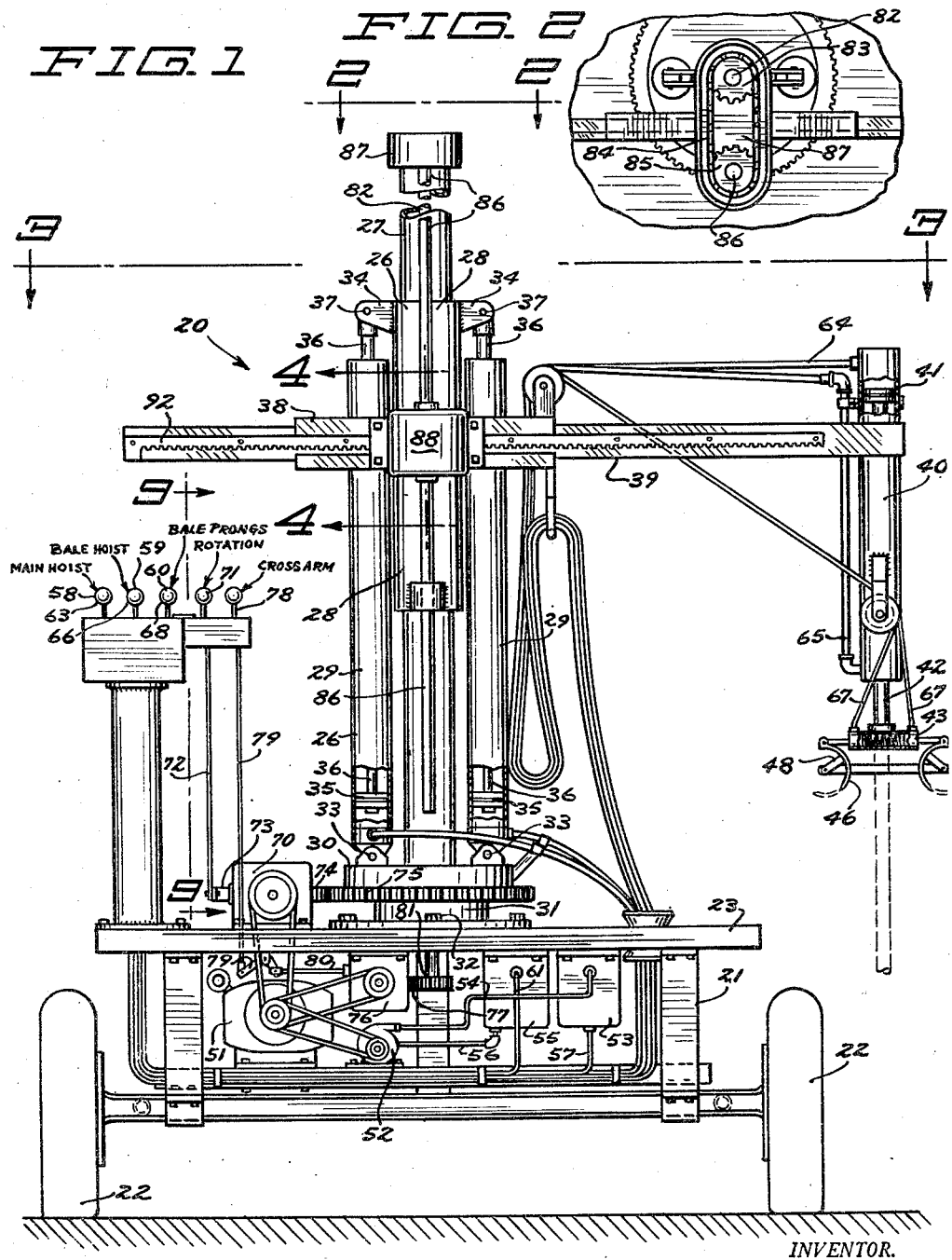

INVENTOR.
REINHOLD DELZER
BY
Braddock and Braddock
ATTORNEYS

United States Patent Office 2,823,947
Patented Feb. 18, 1958

2,823,947
BALE LOADER
Reinhold Delzer, Douglas, N. Dak.
Application December 28, 1953, Serial No. 400,689
4 Claims. (Cl. 294—88)

This invention has relation to a power operated machine useful to engage, lift, transport and release bales of hay or the like.

A device made according to the present invention is entirely power operated and includes a pair of bale prongs for engaging a bale, a main hoist and a bale hoist for lifting the bale, an extensible cross arm for supporting the bale hoist with respect to the main hoist, and mechanism to rotate the main hoist.

A device made according to the present invention will perform the work done by men formerly needed to manually load the bales onto a truck, stack them in piles on the truck, unload them and restack them.

In the past some saving in manpower has been effected by the use of endless belt type loaders to pick up bales in the field and deposit them on a truck bed or to raise them from ground level to level used for storage. This method did not obviate the necessity of having men arrange the bales on the ground so that they could be picked up by the belt loader or of having men handle the bales after they reached the higher level to remove them from the point of discharge of the loader and to stack them in piles for transportation or for storage. It is obvious that the amount of work which can be accomplished each day when the bales must be loaded by this method or by the entirely manual method is limited by the strength and endurance of the men actually handling the bales. In the present invention, the only men needed are the operator of the bale loader and the tractor or truck operator.

In the drawings,

Fig. 1 is an end view of the trailer with an inspection plate thereon removed;

Fig. 2 is a fragmentary top plan view taken on the line 2—2 in Fig. 1;

Fig. 3 is a top plan view, partially in section, taken on the line 3—3 in Fig. 1;

Fig. 4 is an enlarged vertical sectional view taken on the line 4—4 in Fig. 1;

Fig. 7 is an enlarged vertical sectional view taken on the line 7—7 in Fig. 3;

Fig. 8 is an enlarged vertical sectional view taken on the line 8—8 in Fig. 3;

Fig. 9 is an enlarged vertical sectional view taken on the line 9—9 in Fig. 6; and Fig. 10 is an enlarged vertical sectional view of the bale prongs and the operating mechanism associated therewith taken from position as seen in Fig. 1.

Figure 5:
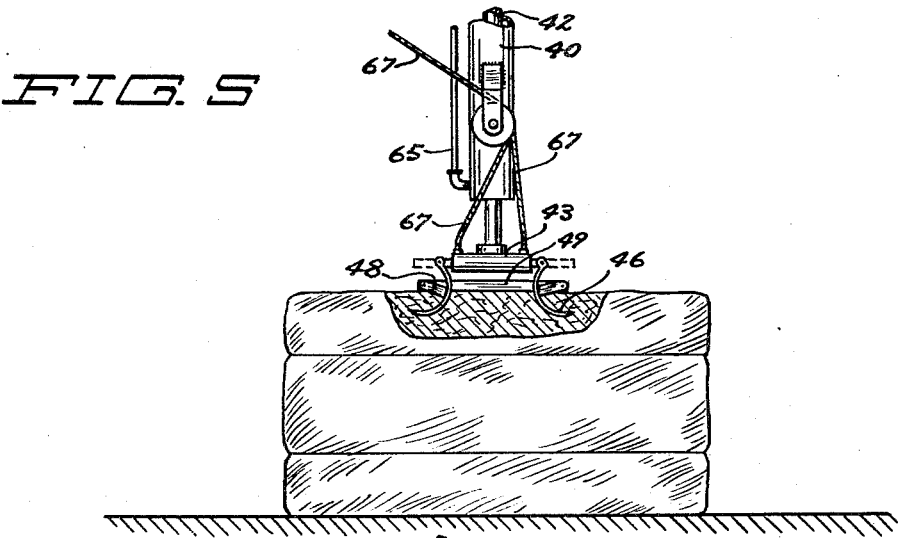
Fig. 5 is a fragmentary view of the device as seen in Fig. 1 showing a pair of bale prongs in engaged relationship to a bale to be loaded.

Referring to the drawings and the numerals of reference thereon, a bale loader 20 is mounted on a trailer body 21 having supporting wheels 22, 22, a platform 23, a tongue 24 and a trailer hitch 25.

A main hoist 26 of the bale loader 20 includes a guide column 27, a guide cylinder 28 slidably mounted on said guide column, and a pair of hoisting cylinders 29, 29 to cause the guide cylinder to be elevated. The guide column 27 is fixedly mounted with respect to an upper supporting ring 30 which is rotatably supported by means of bearings (not shown) on a lower supporting ring 31 which is bolted to the trailer platform 23 as at 32. Each of the hoisting cylinders 29 is likewise fixedly mounted with respect to the upper supporting ring 30 as at 33. Pairs of supporting ears 34, 34 are integral with and extend outwardly from an upper end of the guide cylinder 28. Each of these guide cylinders has a piston 35 operably mounted therein and a piston rod 36 is connected to each of these pistons. Each of the piston rods 36 is connected to one pair of said supporting ears 34 as at 37.

A horizontal slide 38 is fixedly mounted on the guide cylinder 28 and a cross arm 39 is slidably mounted therein. Fixedly mounted to an outer end of said cross arm is a bale hoist cylinder 40. A bale hoist piston 41 is mounted in the cylinder 40 and a piston rod 42 is connected to said piston.

A bale prong actuating cylinder 43 is fixedly mounted to a lower end of a piston rod 42, a pair of pistons 44, 44 are each mounted in opposite ends of the cylinder 43 and a pair of piston rods 45, 45 each extend outwardly from one of said pistons 44. Each one of a pair of curved bale prongs 46, 46 is pivotally mounted to an outer end of one of said piston rods 45 as at 47. Each one of a pair of arms 48, 48 is integral with one of said bale prongs and extends inwardly toward the center of the radius of curvature of said prong. A spacing bar 49 is pivotally connected as at 50 to outer ends of each of the arms 48.

In the present embodiment of the invention, the mechanism for engaging, hoisting, transporting and releasing bales is powered by a combination hydraulic and mechanical system. The power for this system is furnished by a prime mover 51 which may be constituted as an internal combustion engine. A centrifugal pump 52 is driven by the prime mover 51 through the instrumentality of a belt and supplies hydraulic fluid under pressure to an accumulator 53 by means of a pipe 54. The pump 52 draws its hydraulic fluid from a reservoir 55 through pipe 56. A pipe 57 leads from the accumulator to a main hoist control valve 58, a bale hoist control valve 59, and a bale prongs control valve 60. A pipe 61 feeds from the main hoist control valve 58, the bale hoist control valve 59 and the bale prongs control valve 60 to the reservoir 55.

A pipe 62 extends from the main hoist control valve 58 to inside of a lower portion of each of the hoisting cylinders 29, 29. As best seen in Fig. 8, when an operating handle 63 of the main hoist control valve 58 is in the "Raise" position there is a passage inside of the valve from the accumulator pipe 57 to the pipe 62. This permits a flow of hydraulic fluid through the pipe 62 and into a lower portion of each of the hoisting cylinders 29, 29 causing the pistons 35, 35 to be raised and the piston rods 36, 36 acting on the supporting ears 34 to raise the guide cylinder 28, horizontal slide 38, and cross arm 39 with respect to the guide column 27. When the operating handle 63 is moved to the "Neutral" position, the internal construction of the valve is such that the opening of the pipe 62 into the valve is blocked and the hydraulic fluid in the cylinders 29, 29 serves to maintain the cross arm 39 and its associated parts in fixed vertical position. When the operating handle is moved to the "Lower" position there is a passage from the pipe 62, through the control valve 58 to the reservoir pipe 61. The weight of the parts acting through the piston rods 36, 36 on the piston 35 will cause the hydraulic fluid to be forced out of the cylinder, through the pipe 62, the control valve 58 and the pipe 61 to the reservoir 55. As this happens, the cross arm 39 and its associated parts will move in downward direction.

A pipe 64 extends from the bale hoist control valve 59 to the interior of an upper portion of the bale hoist cylinder 40 and a pipe 65 extends from said control valve 59 to a lower portion of said cylinder. When an operating handle 66 of the bale hoist control valve 59 is in the "Raised" position, as best seen in Fig. 7, there is an opening from the high pressure accumulator pipe 57 to the pipe 65 and an opening from the pipe 64 to the reservoir pipe 61. This makes possible a flow of hydraulic fluid under pressure into the bottom of the bale hoist cylinder 40 and it, acting on the piston 41, causes the piston, the piston rod 42 and the parts associated therewith to move in upward direction and so forces the hydraulic fluid in the upper portion of the cylinder 40 to pass along the pipe 64, the valve 59 and the pipe 57 into the reservoir. With the operating handle 66 in the "Neutral" position, the pipes 57 and 61 are blocked where they open into the valve 59 and the hydraulic fluid is trapped in the top and bottom portions of the cylinder 40 to maintain the piston 41 and the parts associated therewith in fixed position. When the operating handle 66 is moved to the "Lower" position, there is an opening from accumulator pipe 61 to the pipe 64 and consequently to the top of the cylinder 40 and there is an opening from the pipe 65 and the lower portion of the cylinder 40 through the valve to the reservoir pipe 61. The hydraulic fluid from the accumulator acting on the top of piston 41 will cause piston rod 42 to be moved in downward direction together with the elements associated with it and will force the fluid out of the bottom portion of the cylinder 40 along the pipe 65, through the valve 59 and into the reservoir through the pipe 61.

The internal construction of the bale prongs control valve 60 is not depicted in the drawings since it is identical in construction to valve 58 disclosed in Fig. 8. A pipe 67 leads from this bale prongs control valve 60 to opposite outer end portions of the bale prong actuating cylinder 43. This pipe has the same relative position with respect to the valve 60 as the pipe 62 has with respect to the valve 58. It will be understood, therefore, that when an operating handle 68 of the bale prong control valve 60 is put in the "Raise" position, there is an opening from the high pressure accumulator pipe 57, through the valve 60 and into the pipe 69. This forces the pistons 44 toward each other against the action of a heavy coil spring 69. Piston rods are moved in inward direction and curved bale prongs 46, 46 move to position as best seen in Fig. 5. When the operating handle 68 is moved to the "Neutral" position, pipe 67 is blocked off and the curved bale prongs, piston rods and pistons will remain held in position. With the operating handle 68 moved to the "Lower" position, there is a passageway along the pipe 67, through the valve 60 to the reservoir pipe 61. The coil spring 69, acting against the pistons 44, 44, will cause these pistons to move outwardly, cause the prongs to be retracted and will force hydraulic fluid out of the ends of the cylinder 43, along pipe 67, through valve 60 and pipe 61 to the reservoir 55.

The prime mover 51 drives gears in a gear box 70 by means of a belt. Operating handle 71, through the instrumentality of linkage 72 and clutch arm 73, causes a gear 74, extending from said gear box, to be rotated in one direction when said operating handle is moved to the right as seen in Fig. 9 and in a reverse direction when said operating handle is moved to the left as seen in Fig. 9. This gear 74 is in meshing relationship to a bull gear 75 which is concentric and fixedly mounted with respect to upper supporting ring 30. Operation of this handle 71 by bale loader operator will cause the bull gear 75 and all of the equipment associated therewith including the main hoist to be rotated in either direction or to stand still. Gear box 76 is mounted on the underside of the platform 23 and has a gear 77 extending therefrom which can be made to rotate in either direction or can be held still by the operation of an operating handle 78 and appropriate linkages 79 controlling a clutch rod 80 of the gear box. This gear 77 meshes with a gear 81 which is fixedly mounted with respect to one end of a rotatable shaft 82 which is concentric with and mounted in guide column 27. A gear 83 is fixedly mounted on said shaft 82 at an opposite end thereof, and a chain 84 operably connects this gear 83 with a gear 85 which is fixedly mounted on one end of a splined shaft 86. A horizontal plate 87 is rigid with the top of the guide column 27 and serves as a bearing and thrust plate for the splined shaft. This shaft 86 extends downwardly through a gear box 88 which is fixedly mounted with respect to the horizontal slide 38. A first bevel gear 89 is slidable along the splined shaft but rotatable therewith and meshes with a second bevel gear 90. A pinion 91 is fixedly positioned with respect to the bevel gear 90 and rotates therewith. This pinion meshes with a horizontal rack 92 which is fixedly mounted on the cross arm 39. When the operating handle 78 is moved to cause the gear 77 to rotate; gear 81, shaft 82 and gear 83 will be driven and the chain 84 will drive gear 85 to rotate the splined shaft 86. This will cause the bevel gears 89 and 90 and pinion 91 to rotate and said pinion will force rack 92 and the cross arm 39 to move outwardly or inwardly with respect to the horizontal slide 38 depending upon the direction of rotation of the parts.

The control valves 58, 59 and 60 and the gear boxes 70 and 76 may be of any usual construction. The mechanism of these parts forms no part of the present invention.

Figure 6:
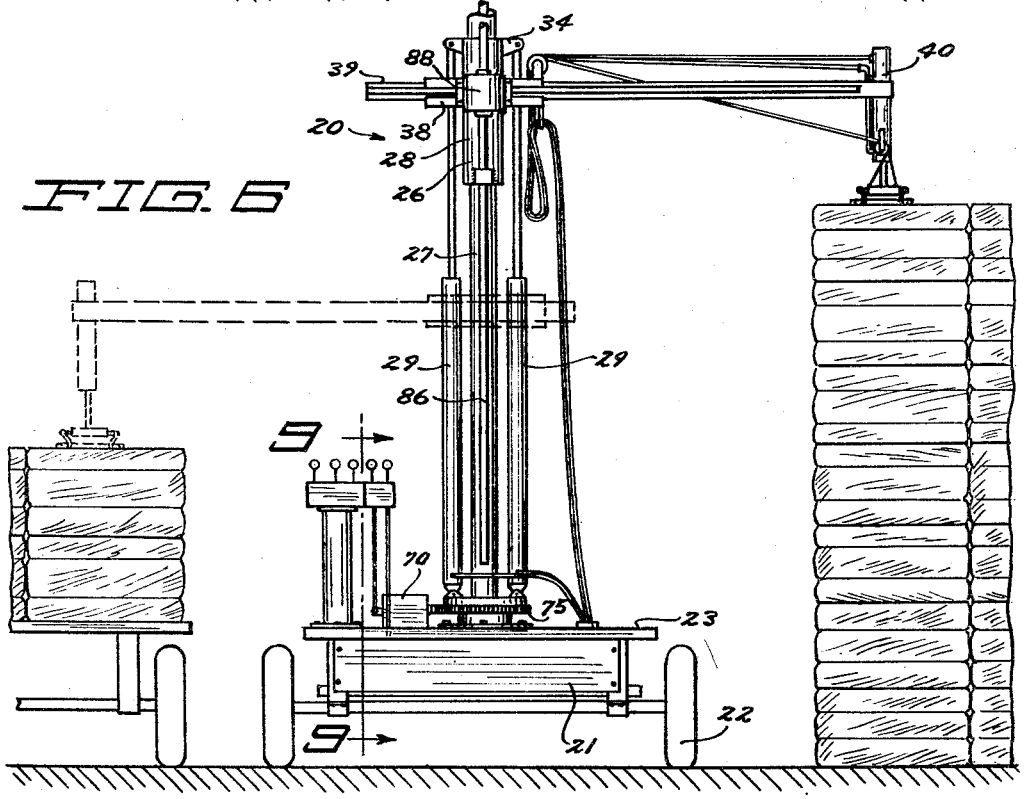
Fig. 6 is an end view of the same end of the device as seen in Fig. 1 at a reduced scale showing parts thereof in operating positions differing from the disclosure of Fig. 1.

In operation, the trailer body 21 is towed into position adjacent bales to be loaded. An operator, through the use of the various handles in the manner described, causes the main hoist to be rotated until the cross arm 39 is in alinement with a bale; causes the cross arm to be extended or retracted to bring the bale hoist cylinder into vertical alinement with the bale; lowers the main hoist and/or the bale hoist to bring the bale prongs into contact with the top of the bale; forces the bale prongs to ride downwardly and outwardly while forcing the bale hoist piston in downward direction; raises and rotates the main hoist to carry the bale to the desired new location; and lowers the main hoist causing the bale to be stacked adjacent other bales as, for example, as seen in Fig. 6, and releases the bale by withdrawing the bale prongs.

What is claimed is:

1. A mechanism for engaging a bale including an actuating cylinder, a pair of pistons each operably mounted in an opposite end of said cylinder, a hydraulic pipe connection from a source of hydraulic fluid under pressure open to the interior of said actuating cylinder at a side of at least one of said pistons opposite the other piston, a pair of piston rods each connected to one of said pistons and each extending outwardly from said actuating cylinder, a pair of arcuate bale prongs lying in a common plane and each pivotally mounted to an outer end of one of said piston rods, a pair of arms each integral with one of said bale prongs and each extending inwardly from one of said bale prongs in the plane of said prong to the center of a circle coincident with the arc of said prong, an otherwise unsupported spacing bar having opposite ends thereof pivotally mounted with respect to ends of said arm at the center of said circle coincident with said bale prong.

2. A mechanism for engaging a bale including a vertical rod, a bale prong actuating cylinder attached to said rod, a pair of bale prong actuating pistons each operably positioned in an opposite end of said bale prong actuating cylinder, a bale prong actuating piston rod extending outwardly from each of said bale prong actuating pistons, an arcuate bale prong pivotally mounted at one end thereof to each of said bale prong actuating piston rods, an arm integral with each of said bale prongs and extending in the plane of said prong to the center of a circle coincident with said prong, and an otherwise unsupported spacing bar pivotally mounted at opposite ends thereof to each of said arms at the center of the circle coincident with said prong.

3. The combination as specified in claim 1 wherein movement of said piston rods in direction to cause said bale prongs to engage a bale causes free ends of said prongs to move in direction away from each other after said free ends have penetrated a bale.

4. The combination as specified in claim 2 wherein movement of said piston rods in direction to cause said bale prongs to engage a bale causes free ends of said prongs to move in direction away from each other after said free ends have penetrated a bale.

References Cited in the file of this patent

UNITED STATES PATENTS

| | | |
|---|---|---|
| 962,779 | Murray | June 28, 1910 |
| 1,134,707 | Stone et al. | Apr. 6, 1915 |
| 1,307,009 | Joy | June 17, 1919 |
| 1,346,160 | Barlow | July 13, 1920 |
| 1,440,722 | Dunnam | Jan. 2, 1923 |
| 1,461,988 | Spikes | July 17, 1923 |
| 1,712,316 | Trebert | May 7, 1929 |
| 2,191,143 | Hiatt | Feb. 20, 1940 |
| 2,322,636 | Kidder | June 22, 1943 |
| 2,591,431 | Henggeler | Apr. 1, 1952 |
| 2,696,926 | Squires et al. | Dec. 14, 1954 |